US007997291B2

(12) United States Patent
Gressette, III et al.

(10) Patent No.: US 7,997,291 B2
(45) Date of Patent: Aug. 16, 2011

(54) PORTABLE HUNTING CHAIR AND BLIND

(76) Inventors: F. Reeves Gressette, III, St. Matthews, SC (US); Michael D. Hardin, Elgin, SC (US); Eric L. Neal, Rock Hill, SC (US)

( * ) Notice: Subject to any disclaimer, the term of this patent is extended or adjusted under 35 U.S.C. 154(b) by 64 days.

(21) Appl. No.: 12/384,548

(22) Filed: Apr. 6, 2009

(65) Prior Publication Data
US 2010/0253118 A1    Oct. 7, 2010

(51) Int. Cl.
*E04H 15/02* (2006.01)
*A47C 29/00* (2006.01)
*E04H 15/58* (2006.01)

(52) U.S. Cl. ....... 135/96; 135/117; 135/120.1; 135/901; 297/184.15; 43/1; 42/94

(58) Field of Classification Search .......... 135/96, 135/901–902, 117, 155, 120.1, 161; 297/31, 297/184.1, 184.11, 184.14–184.15; 42/94; 43/1
See application file for complete search history.

(56) References Cited

U.S. PATENT DOCUMENTS

| | | | | |
|---|---|---|---|---|
| 2,137,427 A * | 11/1938 | Campbell | | 297/23 |
| 4,683,672 A | 8/1987 | Davis | | 43/1 |
| 4,788,997 A | 12/1988 | Clopton | | 135/117 |
| 4,886,229 A * | 12/1989 | Aripze-Gilmore | | 248/125.1 |
| 4,971,089 A * | 11/1990 | Braman | | 135/90 |
| 5,481,817 A * | 1/1996 | Parker | | 248/286.1 |
| 5,492,255 A * | 2/1996 | Gansky et al. | | 224/153 |
| 5,582,458 A * | 12/1996 | Wildt | | 297/184.15 |
| 5,688,024 A * | 11/1997 | Arizpe-Gilmore | | 297/217.1 |
| 6,056,172 A * | 5/2000 | Welsh | | 224/155 |
| 6,439,659 B1 * | 8/2002 | Neubauer, Jr. | | 297/188.01 |
| 6,547,324 B1 * | 4/2003 | Ammann, Jr. | | 297/129 |
| 6,698,131 B2 | 3/2004 | Latschaw | | 43/1 |
| 7,118,172 B1 * | 10/2006 | Pattison-Sheets | | 297/129 |
| 7,311,355 B2 * | 12/2007 | Fargason, III | | 297/184.15 |
| 7,334,837 B1 * | 2/2008 | Long | | 297/16.2 |
| 7,427,101 B1 * | 9/2008 | Zernov | | 297/184.14 |
| 7,490,797 B1 * | 2/2009 | Law | | 248/163.2 |
| D591,069 S * | 4/2009 | Martin | | D6/361 |
| 7,658,140 B2 * | 2/2010 | Lombardi | | 89/37.04 |
| 7,753,441 B1 * | 7/2010 | Gray, Jr. | | 297/188.11 |
| 2002/0112752 A1 | 8/2002 | Blakney | | 135/96 |
| 2003/0046855 A1 | 3/2003 | Bergdall | | 43/1 |
| 2007/0012735 A1 | 1/2007 | Lee et al. | | 224/155 |
| 2010/0019550 A1 * | 1/2010 | Cook et al. | | 297/183.1 |

* cited by examiner

*Primary Examiner* — Winnie Yip
(74) *Attorney, Agent, or Firm* — Thomas L. Moses; Monahan & Moses, LLC

(57) ABSTRACT

A hunting chair with a hunting blind attachment that encircles the chair is disclosed, as well as an attachable camouflage roof covering, all of which may be folded and disassembled in such a way that it fits into a self-contained pack that may be carried on a hunter's back. The chair includes an adjustable, pivoting backrest, a pivoting gun rest with telescoping legs for height adjustment, folding legs, a pouch to contain the disassembled elements, and shoulder straps for carrying the apparatus. In its disassembled state, the roof poles, roof fabric, and blind fabric are packed into a pouch on the back side of the backrest, and the chair is folded into a carrying position. Detachable shoulder straps may be attached to the underside of the seat section, so that the entire chair and blind combination may be carried on a hunter's back into the field.

6 Claims, 8 Drawing Sheets

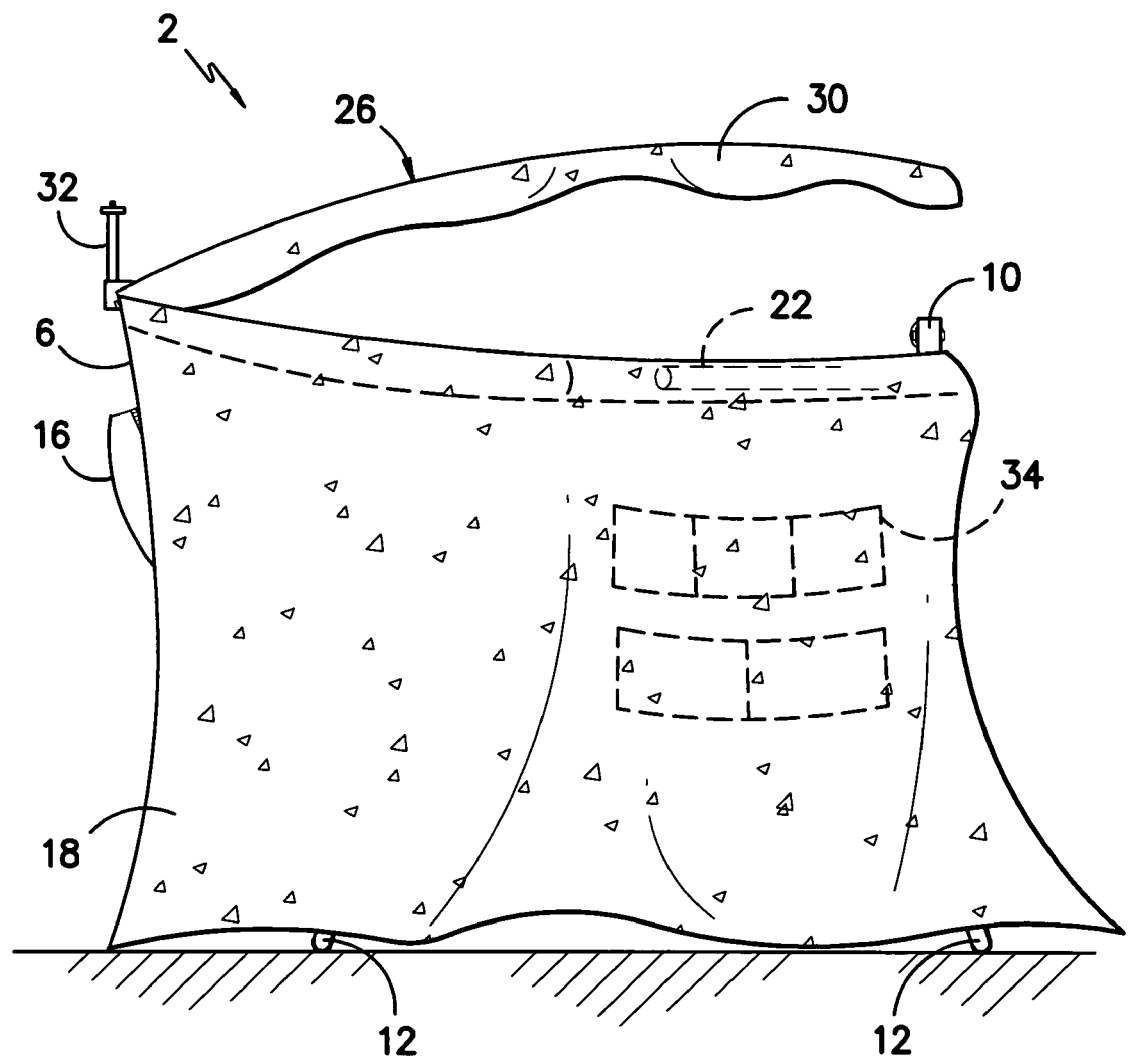
FIG. —1—

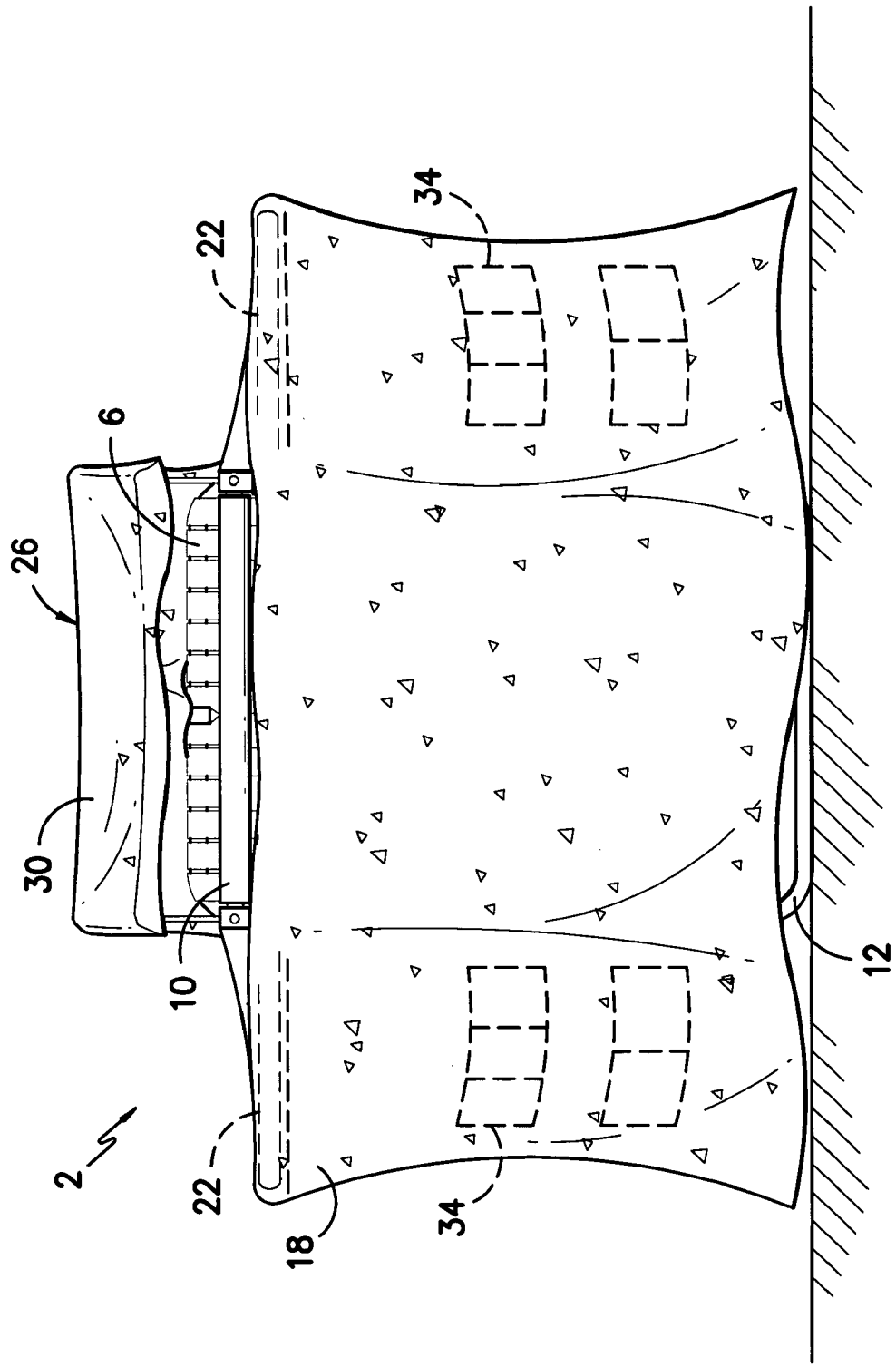
FIG. -2-

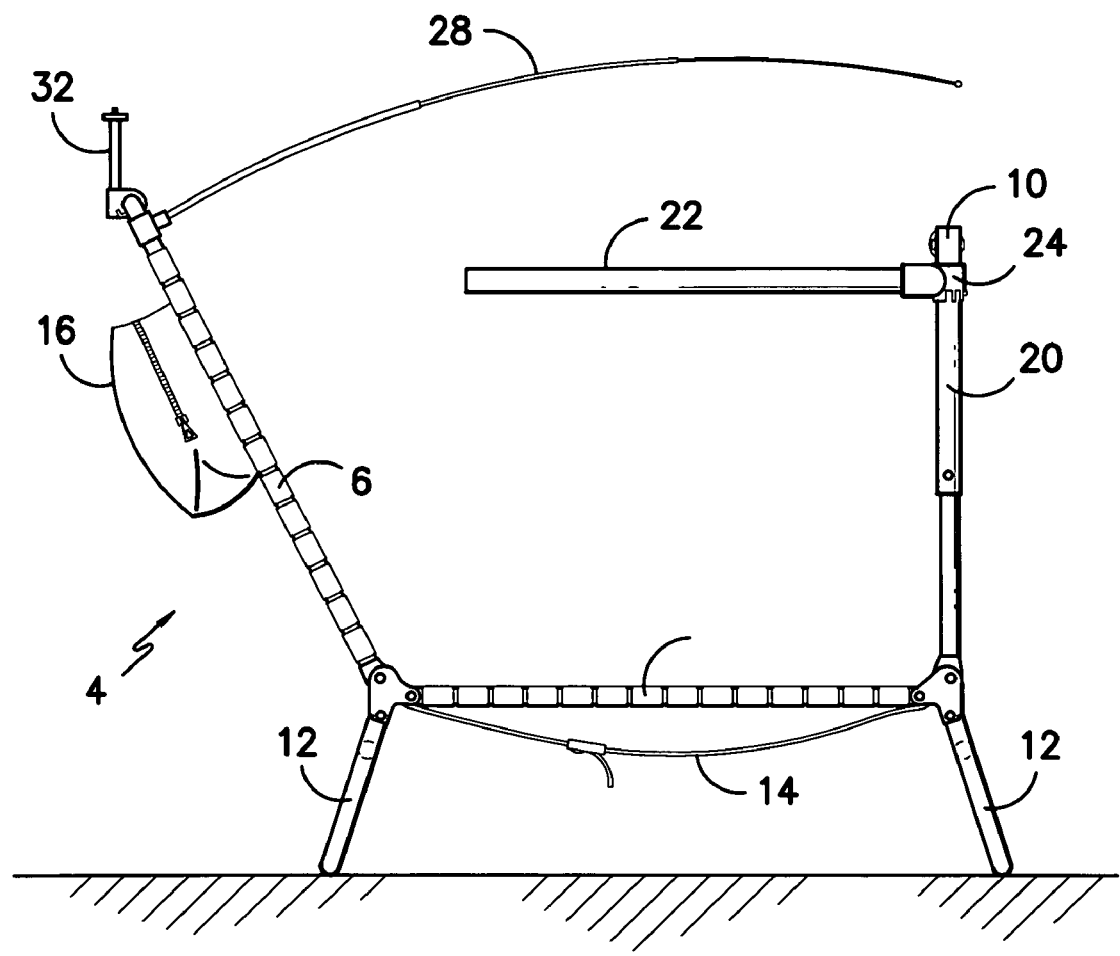
FIG. -3-

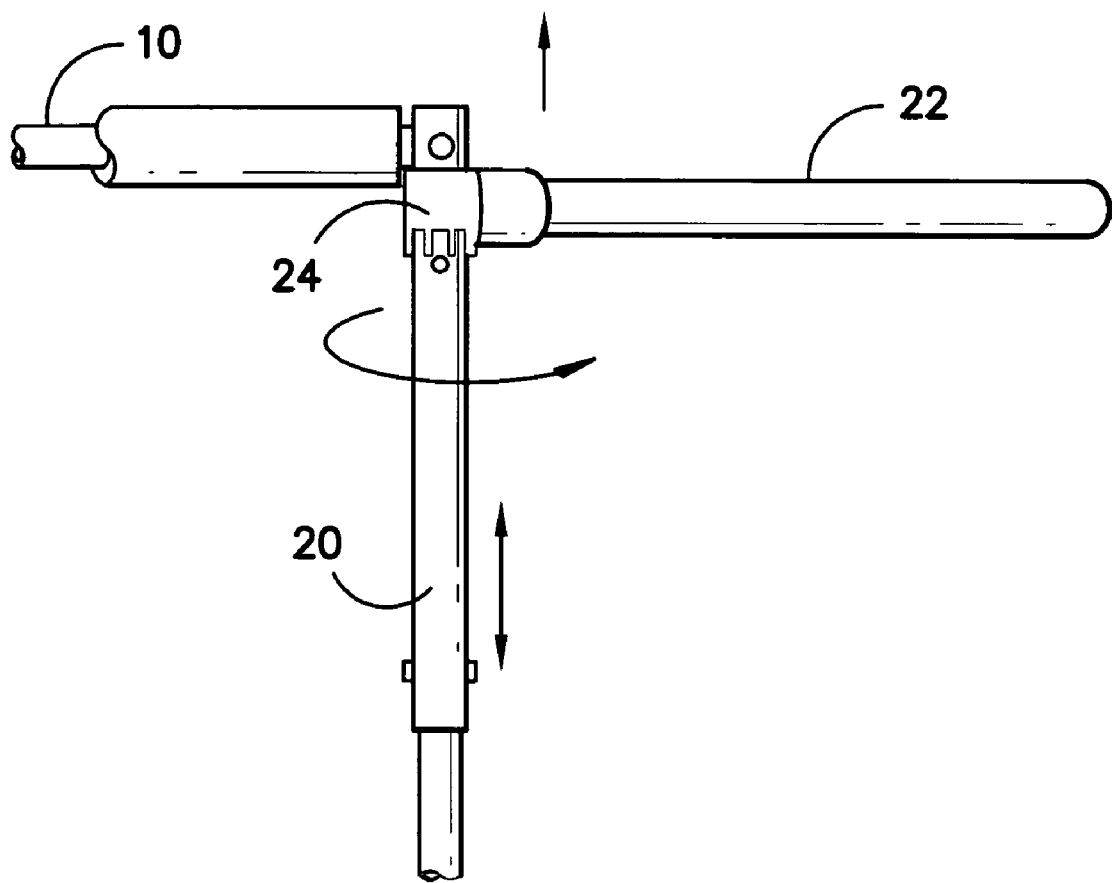
FIG. -4-

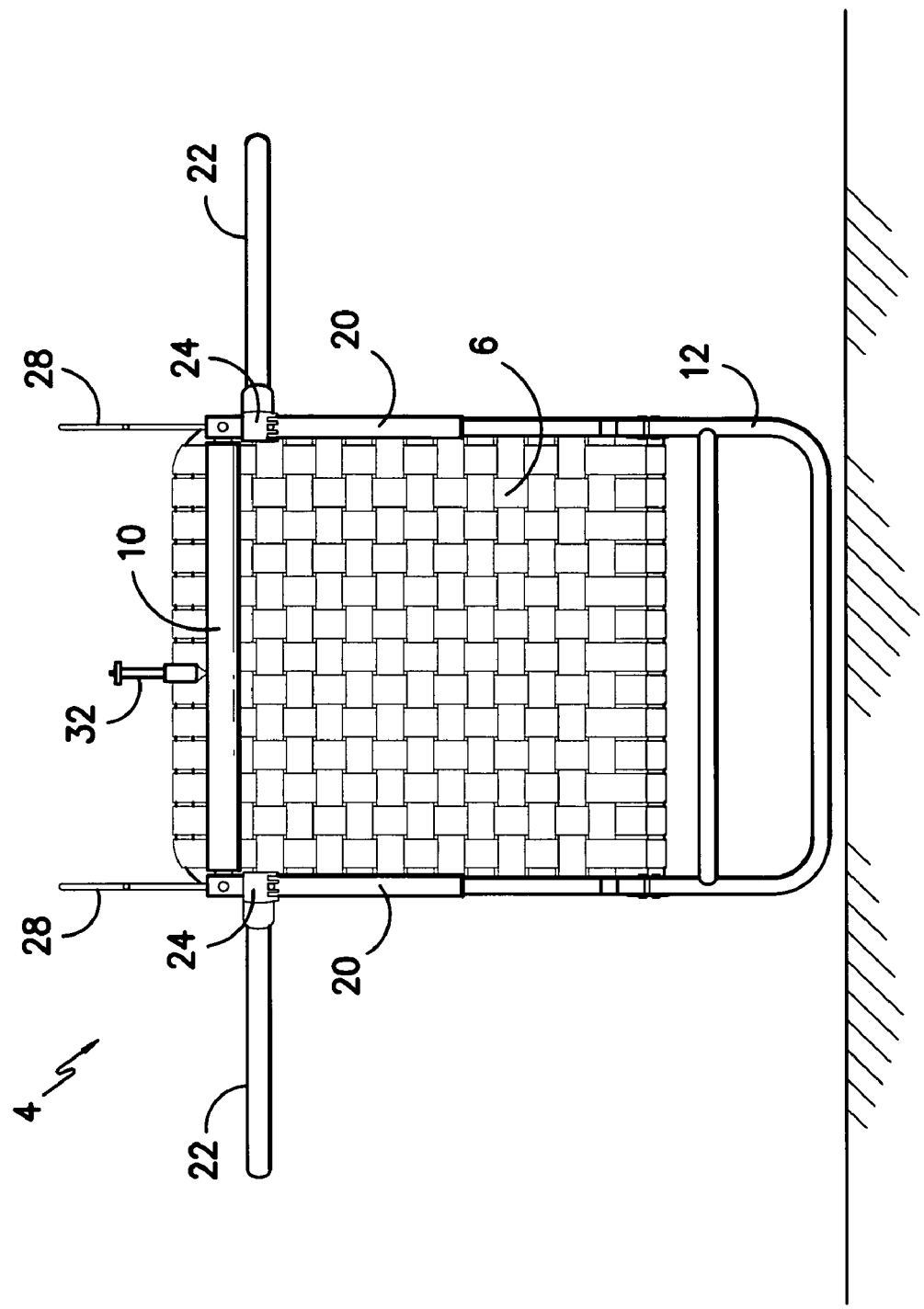

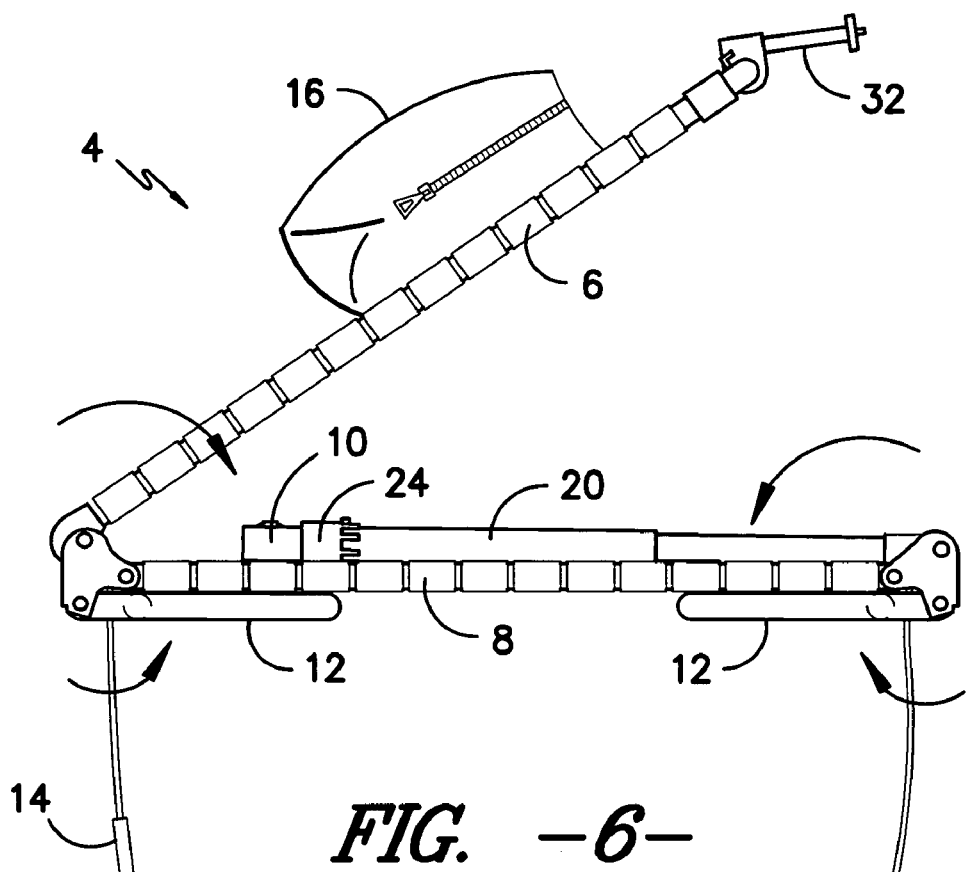
FIG. -6-
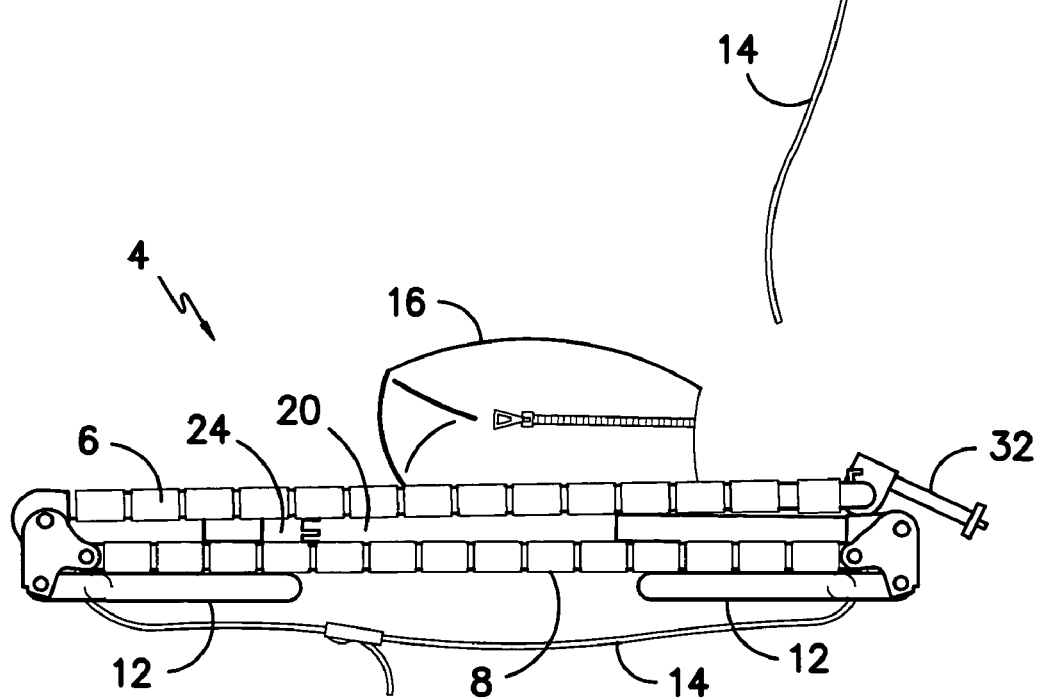
FIG. -7-

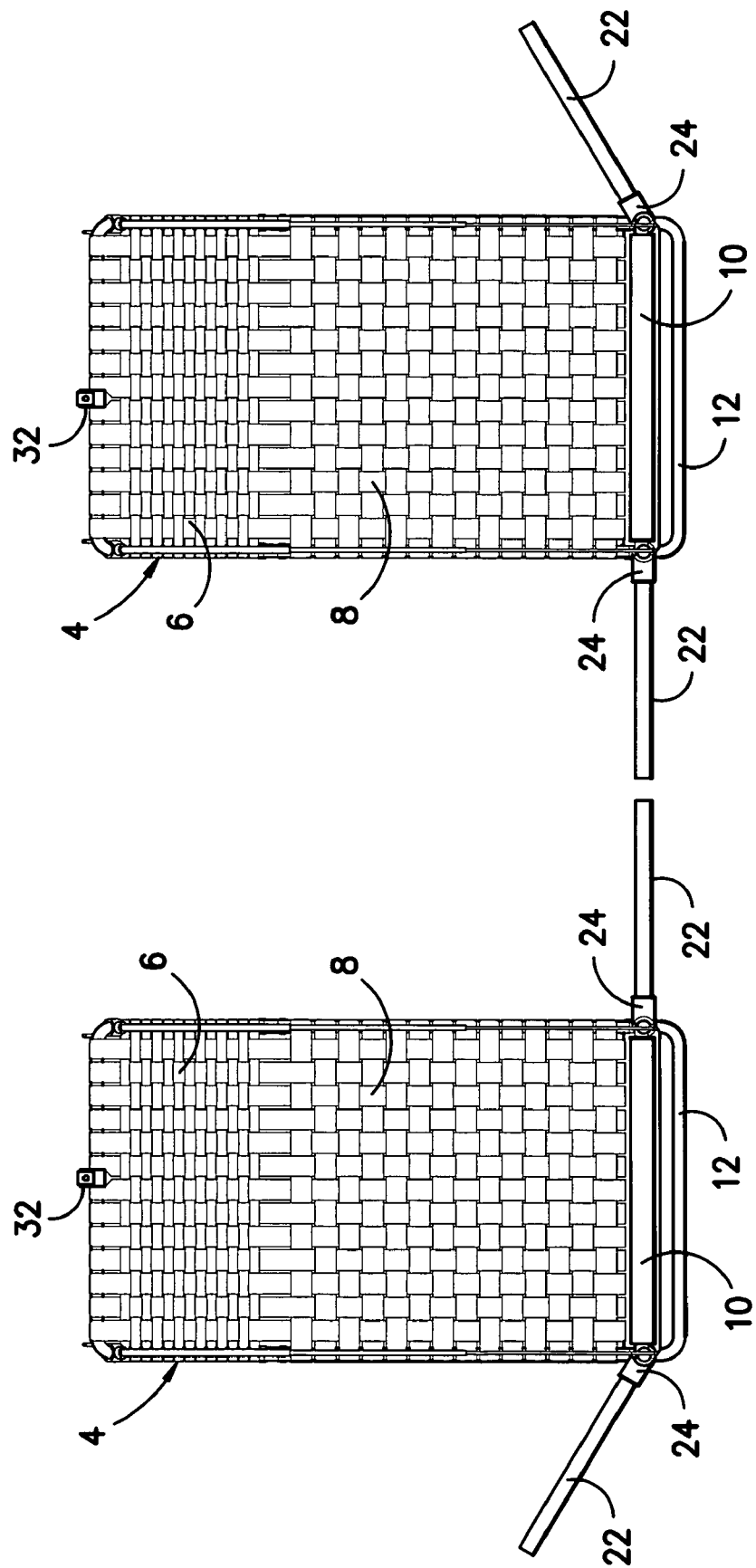
FIG. -8-

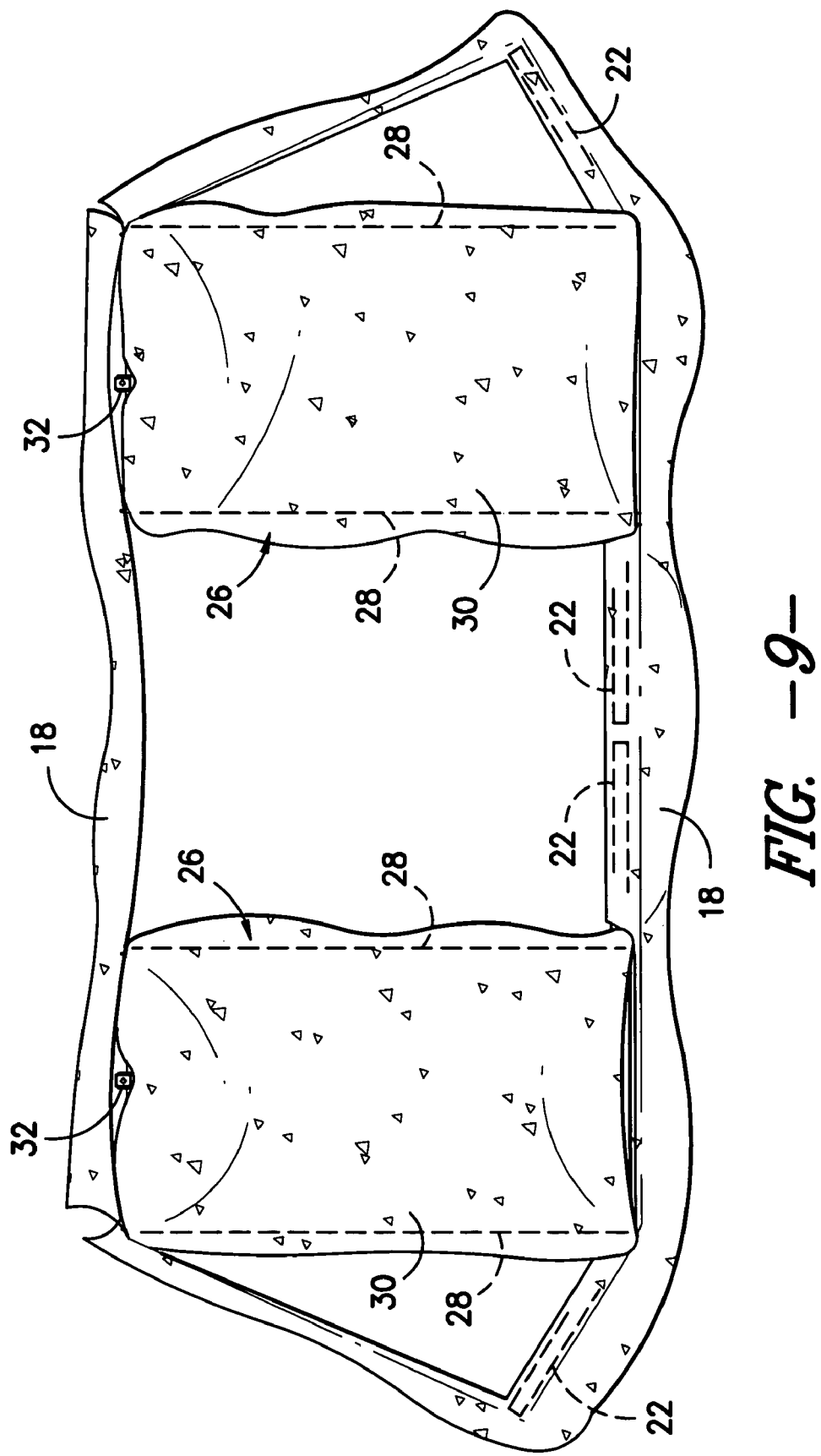
FIG. -9-

PORTABLE HUNTING CHAIR AND BLIND

BACKGROUND OF THE INVENTION

1. Field of the Invention

The present invention relates generally to portable hunting chairs and blinds. More specifically, the present invention includes a folding lounge chair having an attachable camouflage apparatus that is used to conceal hunters from their game. The portable hunting chair and blind may be folded up and carried via shoulder straps by a hunter, and then quickly set up in the field as desired.

2. Description of the Prior Art

Heretofore, efforts have been made to provide portable hunting blinds that may be carried by hunters and erected in the field, with limited success. Some portable blinds are heavy and bulky, and difficult to set up, especially in the dark when hunters set out before dawn to hunt their prey. Additionally, many portable blinds do not fully conceal the hunter from the game, and include complex structural systems that add to the weight and bulk of the apparatus, often requiring an ATV or other 4-wheel drive vehicle to transport the devices to the field. Further, most portable blinds do not include features such as a chair or gun rest, which must be carried and set up separately from the blind itself.

Therefore, it would be desirable to provide a portable hunting blind that includes a chair, gun rest, camouflaged sides and roof, a pouch and shoulder straps, so that the entire apparatus may be disassembled, packed into the pouch (or series of pouches) and carried like a backpack via the shoulder straps.

SUMMARY OF THE INVENTION

In view of the foregoing disadvantages inherent in known portable hunting blinds, it is an object of the present invention to provide a portable chair and hunting blind that is inexpensive to manufacture, easy to assemble and disassemble, and packs into a small package that may be carried on the back of a hunter into the field.

In summary, the present invention includes a hunting chair with a hunting blind attachment that encircles the chair, as well as an attachable camouflage roof covering, all of which may be folded and disassembled in such a way that it fits into a self-contained pack that may be carried on a hunter's back. The chair includes an adjustable, pivoting backrest, a pivoting gun rest with telescoping legs for height adjustment, folding legs, a pouch to contain the disassembled elements, and shoulder straps for carrying the apparatus. The roof covering is essentially a pair of tent-pole style rods that support a textile camouflage cover by sliding through sleeves along the sides of the textile cover (in a preferred embodiment). The support rods are attached to the top portion of the back rest on either side thereof, so that the cover is disposed over the chair. Additionally, the system is configured that two chairs may be encircled by a single blind, so that two hunters may sit and hunt together within the same blind.

In its disassembled state, the roof poles, roof fabric, and blind fabric are packed into a pouch on the back side of the backrest, and the chair is folded into a carrying position. Detachable shoulder straps may be attached to the underside of the seat section, so that the entire chair and blind combination may be carried on a hunter's back into the field.

BRIEF DESCRIPTION OF THE DRAWINGS

These and other features, aspects, and advantages of the present invention will become better understood with regard to the following description, appended claims, and accompanying drawings where:

FIG. 1 is a side view of the portable hunting chair and blind, showing the chair in its set up position, and further showing the blind and roof section attached to the chair to conceal the hunter;

FIG. 2 is a front view of the portable hunting chair and blind, showing the blind attached to the chair in its set up position, and further showing a series of pouches disposed on the inner portion of the blind;

FIG. 3 is a side view of the portable hunting chair in its unfolded position without the blind attached, showing the chair, the roof section, the adjustable gun rest, the pivoting arms, shoulder straps underneath the seat portion, the legs, and a pouch on the back side of the backrest;

FIG. 4 is a sectional side view showing the telescoping gun rest with the pivoting arms attached thereto, and further showing the lock and release mechanism for positioning the pivoting arms in a desired position for holding the blind fabric;

FIG. 5 is front view of the portable hunting chair in a set up position without the blind fabric attached, and illustrating the pivoting arms in an extended position;

FIG. 6 is a side view of the portable hunting chair in a partially folded position, showing the gun rest in its folded position, the legs in the folded position, the backrest in a semi-folded position, and the shoulder straps in an unattached position;

FIG. 7 is a side view of the portable hunting chair in a folded or carrying position, with the backrest and gun rest in a folded position, and the shoulder straps in an attached position;

FIG. 8 is a top view of two portable hunting chairs positioned adjacent one another in such a way that a blind may be positioned in such a way as to encircle both chairs at one time, so that two hunters may share a blind and hunt together; and FIG. 9 is a top view of two hunting chairs positioned adjacent one another, with the blind material encircling both chairs, as well as roof sections covering each chair;

DETAILED DESCRIPTION OF THE INVENTION

A first embodiment of the portable hunting chair and blind 2 is shown in FIGS. 1 and 2. In a preferred embodiment, the portable hunting chair and blind 2 includes a folding lounge chair 4 having a backrest section 6 pivotally attached to a seat section 8, and an adjustable gun rest 10 pivotally attached to an opposed end of the seat section, as shown in FIG. 3. A pair of U-shaped folding legs 12 is provided beneath the seat portion. When the portable chair and hunting blind is folded into the carrying position, as shown in FIGS. 6 and 7, the backrest 6 folds down to a position adjacent, above and parallel with the seat portion 8 and the folding legs 12 are folded into a position directly adjacent, below and parallel with the seat section 8, similar to a lawn chair. The adjustable gun rest 10 also pivotally folds down to a position parallel with the seat portion 8 in a compact position, and further folds down in a position in the same plane as the seat 8 so that it may serve as a foot rest. In a preferred embodiment, a foam pad covers the gun rest 10. The fabric covering the seat 8 and backrest 6 is preferably of a camouflage design, and shoulder straps 14 may be attached underneath a bottom side of the seat portion 8 to facilitate transport of the apparatus on the back of a hunter. A pouch 16 may be attached to the rear side of the backrest 6, and when the apparatus is in the carrying position, the attachable components such as the blind fabric 18 and other structural elements may be carried within the pouch.

In its assembled position as shown in FIGS. 1-3, the adjustable backrest 6 is placed into the desired position, the legs 12 are folded downwardly to support the apparatus, and the gun rest 10 is raised into its desired position. The backrest 6 and the gun rest 10 are each adjustable in a pivotal manner, so that a user may select the angular disposition of each with respect to the horizontally disposed seat section. Additionally, the gun rest has telescoping legs 20 so that a user may also adjust the height of the gun rest.

In one embodiment, a fishing rod holder may be attached to the gun rest 10, so that the apparatus may be used in fishing as well as hunting. For fishing, the blind portion 18 of the apparatus will not likely be necessary. It is also contemplated that the hinges used as pivotal attachments for the gun rest 10 may be adapted so that the gun rest 10 (with the rod holder attached) may be pulled upwardly toward a perpendicular relation with the seat in order to quickly set the hook in a fish's mouth while a fishing rod is positioned within the rod holder on the gun rest 10.

Two pivoting arms 22 are attached to an upper portion of the gun rest 10. The pivoting arms 22 may be folded inwardly for storage and carrying purposes, but are swung outwardly and locked in, preferably at an acute angle with respect to the longitudinal axis of the chair, as shown in FIG. 2. One embodiment of the releasable pivoting arm locking mechanism 24 is shown in FIG. 4. These pivoting arms 22 are used as a structure for attachment of the camouflage blind fabric 18. In a preferred embodiment, after the chair 4 has been set in its desired position for use in the field, a sheet of camouflage blind fabric 18 or material is attached to the chair 4 from one side of the backrest 6 at or near the top, extending to an outer end of the first pivoting arm 22, across the gun rest 10, around the opposed end of the second pivoting arm 22, and back to a top portion of the backrest 6 on the opposite side thereof. Thus, the camouflage blind fabric 18 forms an encircling enclosure about the chair 4, connecting to an upper portion of the backrest section 6 on each side thereof. The sheet of camouflage blind fabric 18 extends downwardly to about ground level, and may include pockets or pouches 34 on an inner portion thereof. The blind fabric 18 may be attached to the various structural elements through any suitable means, including hook and loop fasteners, hooks and grommets, snaps or the like.

The roof covering 26 is essentially a pair of tent-pole style rods 28 that support a textile camouflage cover by sliding through sleeves along the sides of the textile cover 30 (in a preferred embodiment). The support rods 28 are attached to the top portion of the back rest 6 on either side thereof, so that the cover 26 is disposed over the chair. In one embodiment, the support rods 28 are telescoping, so that they are extended for use supporting the roofing fabric 30, but may be retracted and detached from the backrest for storage in the pouch 16. Alternatively, the support rods 28 may connect similarly to tent poles, having an elastic cord running through several sections of the hollow tubes, so that the tubes may be disassembled and still held together in a disassembled state by the elastic cord. Other variations of the support rods 28 are contemplated, including one embodiment where the rods simply fit together and may be disassembled without the elastic cord.

This arrangement allows a hunter an unencumbered view of the field that he or she is hunting because no structural elements are located between the roof and the blind, thus allowing the ability to shoot in any direction.

The structural elements of the portable hunting chair and blind may be made from any suitable material that is strong, light and durable, but it is contemplated that aluminum or various types of plastic or PVC may be especially suitable. The fabric used in the seat and backrest section, as well as the blind and roof material, may also be of any suitable, durable material, but it is contemplated that fabrics made from polyester or nylon having high enough tensile strength to support the weight of a person are preferable for the seat 8 and backrest 6 sections.

In one embodiment, a pair of hunting chair and blinds may be assembled and positioned so that the blind portion encircles both chairs, as shown in FIGS. 8 and 9. In this arrangement, the chairs are set up as described above and shown in FIGS. 8 and 9, and one blind wall 18 extends around the front and sides of the two chairs 4. A second blind wall 18 may be attached along the back portions of the chairs 4 and therebetween, so that the hunters may sit and hunt together. It is further contemplated that the blind fabric 18 may be attached in other configurations, where one section of blind fabric 18 extends around half the perimeter about the chairs 4, and a second section of blind fabric completes the circle about the perimeter of the chairs 4.

Additionally, an optional feature is a camera mount 32 positioned at the top of the backrest 6, so that a still camera or video camera may be mounted to record the action of the hunt.

In use, the portable chair and blind combination 2 is set up in the field as described herein and shown in the accompanying drawings. The hunter may then set the height of the gun rest 10, and sit in the seat 8 with his or her back against the backrest section 6. The hunter's legs will extend from the edge of the seat 8, between the legs 20 of the gun rest 10 and beneath the gun rest itself. The hunter's legs are concealed by the blind fabric 18 hanging from the gun rest 10. Of course, the height of the gun rest 10 may be adjusted at any time, as desired. It may be desired to set up the roof section 26 and connect most of the blind 18 to the chair, leaving one section of the blind unconnected while the hunter climbs into the chair 4, and to then connect the final section of the blind 18 after being seated in the chair 4.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

We claim:

1. A portable hunting chair and blind comprising:
   a chair including a seat member, a backrest member pivotally attached to one side of said seat member, and a gun rest member pivotally attached to an opposed side of said seat member;
   a pair of pivoting arms attached to said gun rest member, wherein said pivoting arms may be locked into a position at an acute angle with respect to a longitudinal axis of said chair;
   wherein said pivoting arms may be folded into a carrying position when not in use;
   legs pivotally attached to an underside of said seat member; and
   a blind fabric removably attached to said pivoting arms and said gun rest member so that said chair is encircled by said blind fabric;
   a detachable roof member comprising a pair of support rods removably attached to said backrest member and a textile roof cover removably attached to said support rods; and
   a pair of shoulder straps removably attached to an underside of said seat member, wherein said backrest member, said legs, and said gun rest member may be folded into a carrying position when not in use and carried by a user's back by means of said shoulder straps.

2. The portable hunting chair and blind set forth in claim 1, wherein said gun rest includes a pair of telescoping legs allowing a height of said gun rest to be adjustable.

3. The portable hunting chair and blind set forth in claim 1, further including a camera mount positioned on an upper portion of said backrest member for supporting a still camera or a video camera.

4. The portable hunting chair and blind set forth in claim 1, wherein said blind fabric has a camouflage design.

5. The portable hunting chair and blind set forth in claim 1, further including a pouch attached to said backrest member.

6. The portable hunting chair and blind set forth in claim 1, further including a fishing rod holder attached to said gun rest.

* * * * *